Sept. 19, 1939.     E. M. SPLAINE     2,173,669
OPHTHALMIC MOUNTING
Filed May 11, 1936     2 Sheets-Sheet 1
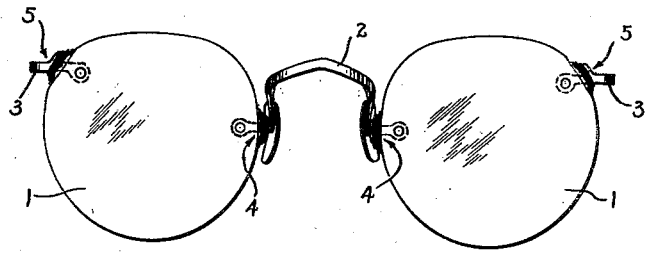
FIG. I
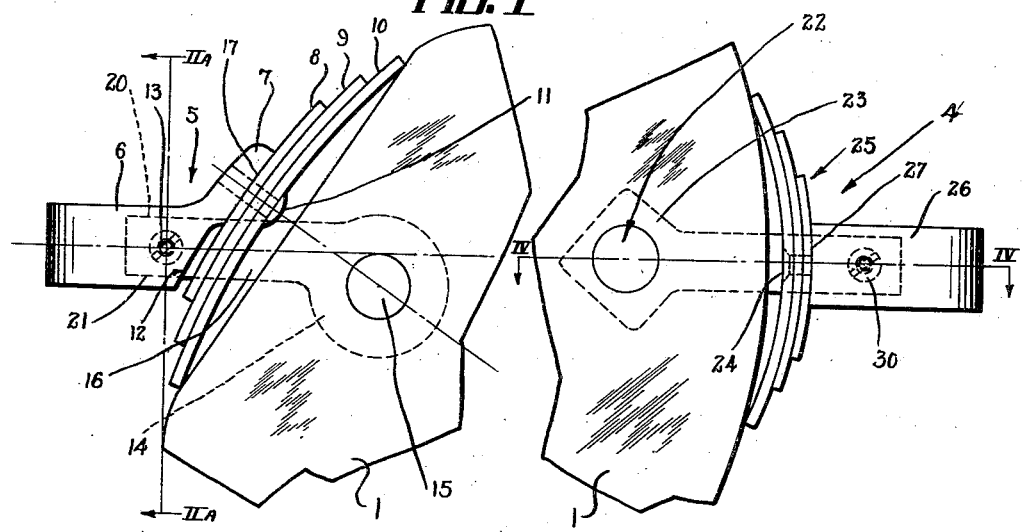
FIG. II     FIG. III
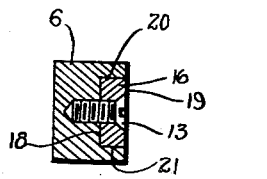
FIG. II A
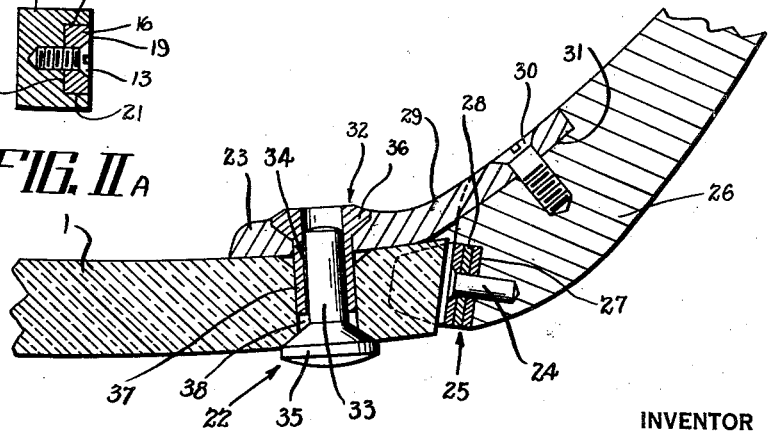
FIG. IV
INVENTOR
EDWARD M. SPLAINE
BY
Harry H. Styll
ATTORNEY

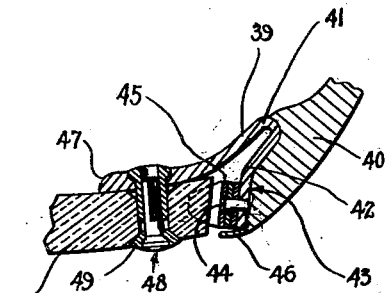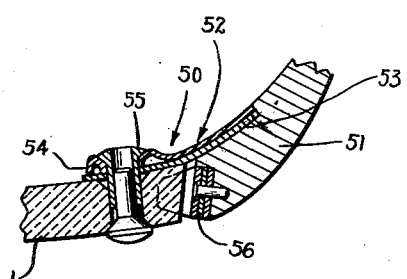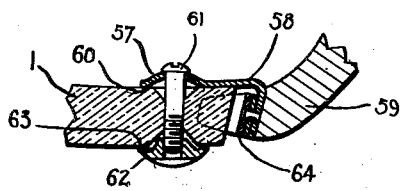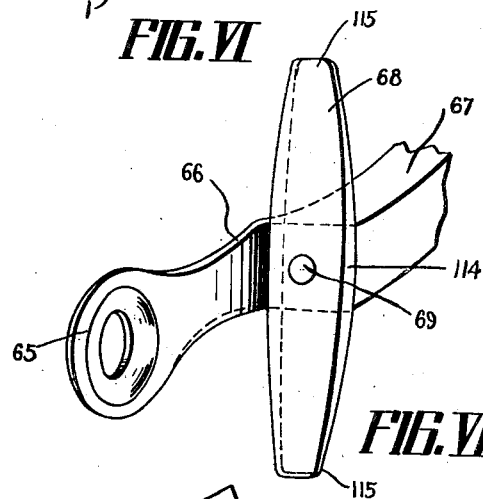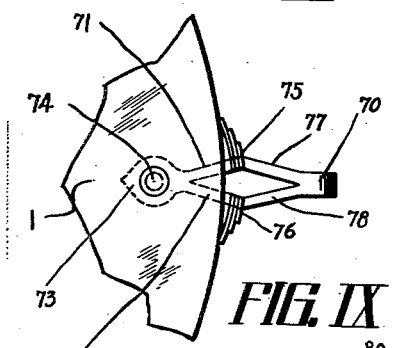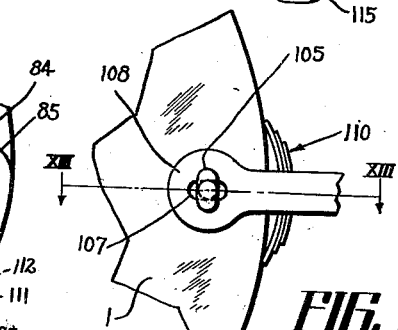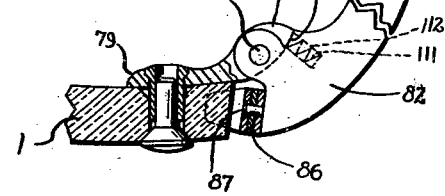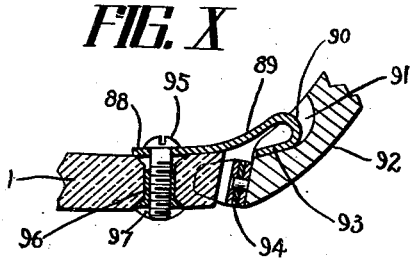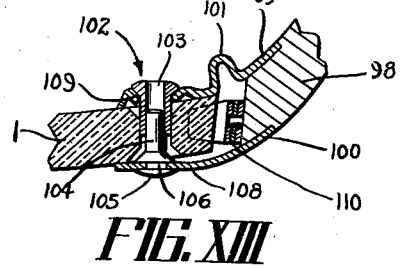

Patented Sept. 19, 1939

2,173,669

UNITED STATES PATENT OFFICE 2,173,669

OPHTHALMIC MOUNTING

Edward M. Splaine, Southbridge, Mass., assignor to American Optical Company, Southbridge, Mass., a voluntary association of Massachusetts Application May 11, 1936, Serial No. 79,055

5 Claims. (Cl. 88—47)

This invention relates to improvements in ophthalmic mountings and has particular reference to improved lens holding means and method of making the same.

One of the principal objects of the invention is to provide improved lens holding means readily applicable to lenses of different thicknesses without special adjustment and that will resiliently ease off the rigidity of the connection of the holding means to the lens in the plane of the lens and also in a direction substantially normal to the plane of the lens, that will insure the said holding means returning to their initial aligned position after easing off, that will maintain the connection of the holding means to the lens relatively firm. to prevent looseness and play during use of the mounting and yet be of such a nature as to relieve shock and strain on the lens in the direction of the plane of the lens and in a diretcion normal to the plane of the lens when the mounting is roughly handled or dropped and that will eliminate the exactness and accurateness in the fitting of the parts to be connected.

Another object of the invention is to provide lens holding means of the above character having a plurality of overlying resilient sections forming the resilient means for absorbing shock and strain in one of the two directions set forth above, or in both directions.

Another object is to provide improved means and method of making lens holding means of the above character wherein the tension of the resilient means, either in or normal to the plane of the lens, may be varied as desired.

Another object of the invention is to provide resilient means for absorbing shock and strain in a direction normal to the plane of the lens whose resiliency is such as to compensate for the resiliency of the resilient means for absorbing shock and strain in the direction of the plane of the lens whereby said lens holding means will be resiliently supported and held in proper aligned relation with the lens when the parts of the lens holding means return to their initial set after flexing.

Another object is to provide lens holding means having a temple support hinged to the lens face engaging portion of the lens holding means for movement in a direction substantially normal to the plane of the lens and having means, associated with said temple support, engaging the edge of the lens for resiliently limiting said movement.

Another object of the invention is to provide improved structural details for devices of this nature.

Another object is to provide lens holding means of the above character which may be connected to the lens at a point above the horizontal center line of the lens or at a point located substantially on the horizontal center line, that is, a high position lens strap or a low position lens strap as is commonly known in the art.

Another object of the invention is to provide novel means and method of making lens holding means of the above character and of attaching said means to the lens.

Other objects and advantages of the invention will become apparent from the following description taken in connection with the accompanying drawings and it will be understood that many changes may be made in the arrangement of parts, details of construction and method shown and described without departing from the spirit of the invention as set forth in the accompanying claims. I, therefore, do not wish to be limited to the exact arrangement of parts, details of construction and method shown and described as the preferred forms only have been shown by way of illustration.

Referring to the drawings:

Fig. I is a front elevation of an ophthalmic mounting embodying the invention;

Fig. II is an enlarged fragmentary view showing the high position lens holding means or lens strap;

Fig. II–A is a sectional view taken on line II–A—II–A of Fig. II;

Fig. III is a view similar to Fig. II showing the low position strap;

Fig. IV is a sectional view taken on line IV—IV of Fig. III;

Figs V, VI and VII are views similar to Fig. IV showing modified forms of the invention;

Fig. VIII is an enlarged perspective view of a portion of the lens holding means shown in Fig. VII;

Fig. IX is a reduced view similar to Fig. II showing another modified form of the invention;

Figs. X and XI are views similar to Fig. IV showing further modifications of the invention;

Fig. XII is a view similar to Fig. IX of a still further modification; and

Fig. XIII is a view taken on line XIII—XIII of Fig. XII.

Much difficulty has been encountered in the past in fitting and securing the lens straps or holding means of rimless type ophthalmic mountings to lenses and of preventing the said straps or holding means from becoming loose and wobbly during use.

One of the difficulties has been that of providing a strap which is readily adaptable to lenses of different thicknesses without requiring special and laborious adjustments, which in the past, required the skill of an expert to properly fit the lens straps to the lenses so that no strain would be imparted thereto with the danger of their becoming broken during use. In many instances, the resilient means for taking up the looseness and play in lens holding means of this character caused much difficulty because the resiliency thereof would soon play out and permit the parts to loosen and move out of aligned relation with each other during use.

Another difficulty was that in most instances the lens holding means was only provided with shock and strain absorbing means in the direction of the plane of the lens with no means provided for relieving shock and strain in a direction normal to the plane of the lens. This, in many instances in the past, was the cause of the lenses becoming broken during use.

It, therefore, is one of the primary objects of this invention to provide improved means and method of making lens holding means which are readily adaptable to lenses having different edge thicknesses without requiring special adjustment of the lens holdng means and which will provide shock and strain absorbing means both in the direction of the plane of the lenses and in a direction substantially normal to the plane of said lenses.

Referring more particularly to the drawings wherein like characters of reference designate like parts throughout the several views, the device embodying the invention is adapted particularly for use in assembling the parts of a rimless type ophthalmic mounting, such as shown in Fig. I. The mounting is of the usual type comprising a pair of lenses 1, connected by a bridge member 2, and having the usual temple supports 3. The bridge member and temple supports are connected to the lenses by the lens holding means or lens straps 4 and 5 respectively, embodying the invention.

In Fig. II the lens strap 5, or high position type lens strap, is illustrated. This lens strap comprises a main body portion 6 to which the temples of the mounting are attached in the usual prior art manner. The body portion 6 is provided with an upwardly projecting portion 7 having a plurality of resilient members 8, 9 and 10 secured thereto by a headed pin member 11. These resilient members are adapted to engage the edge of the lens and may comprise three superimposed sections as illustrated, or may be increased or decreased in number as desired, depending, of course, upon the size, thickness and rigidity thereof.

The body portion 6 is cut away, as illustrated at 12, to provide clearance for the flexing of the lower extremities of the resilient sections and has attached thereto by means of a screw member 13 or other securing means, a lens face engaging portion 14. Said lens face engaging portion, adapted to be positioned on the rear or eye side of the lens, is attached to the lens by means of a headed screw member 15 or other desirable connecting means known in the art which extends through a hole in the lens and is connected to the lens face engaging portion. The lens face engaging portion intermediate its point of attachment of the body portion 6 and to the lens is provided with a resilient portion 16 which is adapted to flex in a direction substantially normal to the plane of the lens, the said resilient sections 8, 9 and 10 being adapted to be flexed in the direction of the plane of the lens or in a direction substantially normal to the direction of the flexing of the portion 16. This arrangement, therefore, provides lens holding means which will resiliently ease off shocks and strains on the lens both in a direction of the plane of the lens and in a direction substantially normal to said plane.

It is specifically pointed out that the connecting means 15 is adapted to provide a pivotal connection of the lens holding means to the lens and is preferably located on a line lying substantially normal to a line tangent with the edge of the lens and extending through the point of attachment 11 of the resilient sections 8, 9 and 10 to the upwardly projecting portion 7. In this particular instance, the point of attachment 15 has its center located below the horizontal center line of the portion 16 while the point of attachment 11 of the resilient means to the upwardly projecting portion 7 lies on the opposite side of said horizontal center line. The face 17 of the upwardly projecting portion 7 to which the resilient means is attached is preferably curved or cupped in the direction of the longitudinal axis of the resilient means substantially to the normal curvature of the adjacent resilient section 8 of said resilient means. This feature of curving or cupping the face 17 tends to cause the various resilient sections to maintain the curvature to which they were initially formed prior to their being assembled with the upwardly projecting portion 7 and tends to cause them to retain this shape during use.

It will be noted that the various resilient sections on the opposite sides of their point of attachment 11 to the upwardly projection portion 7 are of substantially equal lengths and are adapted to provide substantially equal bearing pressure on the opposite sides of the connecting means 15 to the lens when the parts are in their normal position of use.

The portion 16, adjacent the point of attachment 13 thereof to the body portion 6, is preferably positioned, as shown in Fig. II-A, within a groove 18 formed in the rear of the arm 6 with its outer or rear surface 19 flush with the rear surface of the body portion, the groove 18 being adapted to provide support means engaging the portion 16 along the upper and lower edges thereof, as illustrated at 20 and 21, to prevent side twisting thereof relative to the body portion 6 and possible disalignment of the parts during use.

Attention is directed to the fact that the resiliency of the portion 16 and the combined resiliency of the portions 8, 9 and 10 are so balanced that the parts will be held in proper aligned relation with the lens when in their normal position of use and if flexed and released will tend to return to their initial set and support the parts in their desired aligned relation with each other.

In Figs. III and IV, the lens holding means or lens strap 4 is illustrated and is substantially identical in structural details to the construction of the high position strap 5, illustrated in Fig. II, the only difference being that the connecting means 22 of the lens face engaging portion 23 to the lens, the connecting means 24 of the resilient means 25 to the body portion 26 and the said body portion all lie substantially on the longitudinal center line of the lens face engaging portion 23, the longitudinal center line lying substantially in the horizontal meridian of the lens.

In this instance, the body portion 26 is provided with a curved face 27 to which the resilient means 25 is attached by the connecting means 24. The seat 27 is provided with a shoulder 28 in the rear of the resilient means 25 and is adapted to provide a side wall engaging the inner edges of the various sections of the resilient means 25 throughout the width of the attaching face 27 to support the said sections in aligned stacked relation with each other during use. The lens face engaging portion 23 is provided with a resilient portion 29 similar to the portion 16 of Fig. II, which is attached to the body portion 26 by means of a connecting screw 30 or other suitable means. In this instance, the body portion 26 is provided with a groove 31, similar to the groove 18 of Fig. II-A, in which the end of the portion 29 is secured and held against disalignment with the body portion 26.

It is to be understood that the resiliency of the portion 29 is so controlled as to work in coordination with the resiliency of the resilient means 25 to support the parts in proper aligned relation with each other during use.

The connecting means 22 for attaching the lens face engaging portion 23 to the lens is, in this instance, preferably formed of two telescoping members 32 and 33, secured together when in proper assembled relation with each other by means of soft solder, cement or other suitable means, as illustrated at 34. The member 33 is in the form of a pin having an enlarged head 35 adapted to engage the front surface of the lens adjacent the opening 38 in the lens and the pin portion thereof is adapted to extend internally of the opening and fit in telescoped relation with the member 32, which in this instance, is in the form of a tubular member having an enlarged head portion 36 engaging the lens face engaging portion adjacent the opening therein and having a reduced tubular portion 37 extending through the opening 23 and into the opening 38 in the lens, the portions of the pin member 33 and tubular member 37 being secured in integral relation with each other by the solder means 34.

It is apparent that with the above constructions, such as shown in Figs. I to IV inclusive, wherein the lens holding means is preferably provided with only one lens face engaging portion lying in the rear of the lens, that the said lens holding means may be attached to lenses of any thickness without requiring adjustment of the lens face engaging portions, such as was usual in the prior art when the lens holding means were provided with two lens face engaging members, one engaging the front surface of the lens and the other the rear surface of the lens. In this particular instance, however, it is necessary to provide connecting means 15 or 22, as the case may be, which is of such a construction and length that it is adaptable to lenses of different thicknesses.

It is to be particularly noted that in the constructions set forth above, the resilient portion 29 or 16, as the case may be, is adapted to resiliently support the temple endpiece member 6 or 26 in such a manner that the said endpiece member or temple support may be moved rearwardly or forwardly relative to the plane of the lens. These resilient portions 29 or 16, as the case may be, relieve shock and strain on the lens in said directions and are adapted to resiliently limit the rearward movement of the endpieces or temple supports. The shock and strain of the lens holding means on the lens when the temple support or endpiece member is moved in a forward direction relative to the plane of the lens is also absorbed by the resilient means 25 or 8, 9 and 10, as the case may be. Said resilient means 25, as well as the resilient means 8, 9 and 10, is also adapted to ease off the pivotal movement of the lens holding means on the lens in the direction of the plane of the lens. In Figs. I to IV inclusive, the resilient means are illustrated as being formed of a plurality of superimposed members of varying lengths which during the pivotal movement of the lens holding means on the lens are adapted to have sliding movement relative to each other during the flexing thereof. This sliding movement introduces a friction between each of the respective superimposed members, particularly adjacent the ends thereof, and tends to cooperate with the resiliency of said members to relieve shock and strain on the lens. The direct movement of the temple support 26, as shown in Fig. IV, rearwardly or forwardly relative to the plane of the lens without causing the said lens holding member to move about its pivotal connection to the lens causes the plurality of superimposed resilient members 25 to compress and retract in such a manner that the opposite ends of the said resilient sections under the action of compression will move outwardly in opposite directions causing the distance between the adjacent ends of the resilient means on the opposite sides of the lens holding means to decrease and the retraction of said resilient sections due to their tendency to return to their initial set after compression causing the distance between said respective ends to increase.

When the lens holding means is moved about its pivot connection to the lens, for example in a downward direction, pressure of the said lens holding means on the lower portion of the resilient means will cause said lower resilient sections to flatten or compress with the result that the distance between the adjacent ends of the respective resilient sections will be decreased. On the other hand the pressure on the upper portion of said resilient means will be decreased tending to cause the various resilient sections to return to their initial set and in doing so increase the distance between the upper adjacent ends of the respective resilient sections. It is apparent, therefore, that when the lens holding means is moved about its pivot in the opposite direction the upper resilient members will be compressed and the lower portions thereof allowed to tend to return to their initial set whereby the direct reverse of the movement of the ends of the respective resilient sections will result. The resilient means, therefore, which engages the edge of the lens in this particular type of lens holding means not only functions to relieve shocks and strains in the direction of the plane of the lens but also aids in relieving shocks and strains in a direction normal to the plane of the lens.

In Fig. V, there is shown a further modification wherein the resilient portion 39, which permits the temple supporting portion 40 of the lens holding means to move rearwardly and forwardly with respect to the plane of the lens, is provided with a loop portion 41 and a forwardly extending portion 42 attached to the lens holding means at the point 43 by spot welding, soldering or other suitable means. It is apparent that if desired, the portion 42 may be attached to the temple supporting portion of the lens holding means by means of a pin member 44 similar to that utilized for securing the superimposed resilient sections 45 to the portion 42. The superimposed resilient sections 45 are similar to the resilient means 25, shown in Fig. III and function in a similar manner. The purpose of providing the resilient portion 39 with the loop 41 and forwardly extending portion 42 is to increase the length of and the resilient action of said portion.

The temple supporting portion 40 is preferably provided with a lip 46 which is adapted to overlie the forward edges of the resilient members 45 and the forward end of the portion 43. This lip, when viewed from the front, is of a width substantially equal to the width of the temple supporting portion 40, that is, it is adapted to overlie the central portion of the resilient means 45 adjacent their point of attachment to the temple supporting arm 40. The resilient portion 39 is provided with a lens face engaging end 47 having a perforation therein adapted to receive suitable connecting means 48 such as a screw, telescoping pin and tubular member secured together by solder means or any other suitable means. In this particular instance, the connecting means illustrated is of the pin and tubular type and differs only from the construction shown in Fig. IV in that the pin member is provided with a relatively small head and has suitable washer or like means 49 thereon, which is adapted to engage the lens throughout the periphery of the opening therein for the connecting means.

In Fig. VI, a structure similar to the structure shown in Fig. V is illustrated, except in this instance, the means 50 for attaching the temple support 51 to the lens, is formed of a plurality of superimposed resilient members 52 secured as at 53 to the temple support 51 by spot welding or other suitable means. One of the superimposed resilient members 52 is provided with a cupped end 54 having a bevelled inner surface 55 adapted to receive the tubular portion of the connecting means and providing a seat for the bevelled head thereof. The resilient means 56 for engaging the edge of the lens is, in this instance, formed of a plurality of superimposed members and the device in its function is generally similar to the previously described device.

In Fig. VII is shown another modification wherein the lens face engaging portion 57 of the resilient means 58 for attaching the temple support 59 to the lens is cupped so as to provide a substantially circular line contact 60 with the lens at a distance spaced slightly from the peripheral edge of the opening therein for the lens connecting means 61, which in this instance, is illustrated as a screw member having a nut 62 attached thereto on the side of the lens opposite the cup shaped portion 57. The nut 62 is also cupped so as to provide substantially circular line contact throughout the edge 63 with the face of the lens. This construction removes the strain of the connecting means on the lens and it distributes contact of the lens holding means to the lens throughout a greater area. In this particular instance, the resilient lens edge engaging means 64 is formed of a pair of superimposed resilient members, preferably of varying lengths, with the longest member engaging the edge of the lens.

Fig. VIII is a perspective view of a lens strap generally similar to that of Fig. VII wherein the lens face engaging portion 65 is cupped and is provided with a resilient portion 66 for securing the temple support 67 to the lens. The resilient lens edge engaging means 68 is in the form of a single black spring attached to the temple support 67 by a pin, screw, spot welding or other suitable means at a point illustrated as at 69, having a relatively thick center 114 tapering to thin end portions 115.

In Fig. IX there is shown a further modification wherein the resilient portion for attaching the temple support 70 to the lens is split to form two spaced resilient members 71 and 72. The said resilient members 71 and 72 have an integral perforated end 73 provided with a lens face engaging portion which is adapted to be secured to the lens by a screw or other suitable connecting means 47. The resilient lens engaging means, in this particular instance, is separated into two spaced groups 75 and 76, each formed of a plurality of superimposed resilient members of varying lengths and the temple support 70 is divided into two spaced sections 77 and 78 to which the separated groups of resilient members 75 and 76 are respectively attached. The object of separating the temple support, as illustrated, is to provide means whereby the space between the portions 77 and 78 may be increased or decreased to vary the pressure of the separate groups of resilient members 75 and 76 on the edge of the lens. By increasing the space between the portion 77 and 78, the pressure of the resilient lens edge engaging means will be increased and by decreasing said space, the pressure of the lens edge engaging means will proportionally be decreased.

In Fig. X, there is shown a further modification wherein instead of providing the lens face engaging portion 79 with a resilient portion, as set forth in the previously described constructions, the lens face engaging portion is formed relatively rigid and is provided with a portion 80 extending beyond the peripheral edge of the lens. The portion 80 is provided with a pivotal connection 81 to the temple support 82 whereby the said temple support has a free pivotal movement in a direction transversely of the plane of the lens. To limit the rearward swing of the temple support, the portion 80 is provided with a face 83 adapted to contact with an abutment on the rear surface of the temple support 82. The temple 84 is pivotally attached at 85 to the rearwardly extending end of the support 82.

A plurality of superimposed resilient members 86 are attached to the end of the temple support 82 adjacent the edge of the lens by a pin member 87 or by spot welding or other suitable means.

In Fig. XI there is shown a further modification wherein the lens face engaging portion 88 is provided with a resilient portion 89 having a loop 90 set within a groove or recess 91 formed in the rear surface of the temple support 92. The inner end 93 of the looped portion 90 is secured to the bottom of the groove 91 by means of spot welding or other suitable means. The resilient means 94 for engaging the edge of the lens is generally similar to the plurality of resilient members illustrated in Figs. III and IV and functions in a similar manner. The connecting means, in this particicular instance, is in the form of a screw member 95 which is threadedly connected to a tubular member 96 having an enlarged head portion formed with a slot 97 for receiving a suitable tightening tool.

In Figs. XII and XIII there is shown a further modification wherein the temple support 98 has two resilient lens face engaging portions 99 and 100 attached thereto by spot welding or other suitable means. The resilient lens face engaging portion 99 is preferably provided with a loop 101 to increase the resiliency thereof and adjacent its end which is adapted to engage the rear surface of the lens, it is provided with a perforation adapted to receive the lens connecting means 102. The lens connecting means 102, in this instance, is preferably in the form of a tubular member 103 and a pin member 104. The pin member 104 is provided with an enlarged head 105 of oblong shape having a circumferential groove 106 formed therein and is adapted to be positioned within an opening or slot 107 formed in the end 108 of the resilient means 100. The head 105 of the pin member is adapted to be fitted through the opening 107 in the lens face engaging portion 108 and be twisted approximately 90° so that it cannot be withdrawn from the opening 107. A portion of the lens face engaging portion 108 adjacent the opening is in this manner positioned within the circumferential groove 106 of the head and tends to lock the pin to said lens face engaging portion and yet permits movement of the lens face engaging portion in a direction transversely of the axis of the pin type holding member or in a direction longitudinally of the slot 107 when the temple supporting portion 98 is moved in a direction rearwardly or forwardly of the plane of the lens. The pin 104 and tubular member 103 are then integrally united by solder or other suitable means internally of the tube. To prevent twisting of the pin and tubular member relative to the lens face engaging portions during use, the bevelled portion of the head of the tube, as illustrated at 109, is preferably provided with a toothed surface adapted to engage with a similar surface formed on the re-entrant bevelled portion of the lens face engaging part of the resilient means 99. With this arrangement, the lens holding means may be provided with spaced resilient lens face engaging portions which will be free to be flexed in a direction rearwardly or forwardly of the plane of the lens and in the direction of the plane of the lens. There is provided the usual resilient lens edge engaging means 110 which are similar in construction and function in a similar manner to the resilient means 25 of Fig. III.

It will be noted that although in most of the modifications, the resilient lens edge engaging portion of the lens holding means is shown and described as being formed of a plurality of resilient members of varying lengths, they may be formed to equal lengths if desired. The said resilient members may be formed of material having the same degree of resiliency or of different resiliencies with the longer section of the resilient means more resilient than the shorter sections. The said resilient means may also be formed of a single resilient member, the only point of interest being, that the resiliency must be controlled and balanced with the resiliency of the resilient portion of the lens face engaging means so that the parts will be supported in proper aligned relation with each other when the various resilient portions are in their normal position of use.

It will also be apparent that the resilient portions of the lens face engaging means may, in most instances, be formed of a single layer or of a plurality of superimposed layers as desired.

Referring more particularly to Fig. X, it will be noted that the resilient means 86 not only absorbs shocks and strains in the direction of the edge or plane of the lens but also absorbs shocks and strains in a direction substantially normal to the plane of the lens. If desired, however, the face 83 of the projecting portion of the arm 80 may be spaced relative to the rear surface of the temple support 82 and a coil spring or other suitable means 111 may be provided to resiliently ease off the movement of the temple support about its pivotal connection 81 to the lens face engaging portion 79. In this instance, the coil spring would be mounted within an opening 112 formed in the rear of the arm 82.

From the foregoing description it will be seen that there is provided lens holding means which will be free to absorb shocks and strains in a direction transversely or normal to the plane of the lens and in the direction of the plane of the lens together with lens holding means which is readily adaptable to lenses of varying thicknesses without the usual prior adjustments which, in the past, have been necessary with lens holding means of the prior art type having normally rigid but pliable spaced lens face engaging portions.

It is to be understood that the structural details or parts thereof shown in the different views of the drawings and described throughout the specification may be incorporated in each of the various structures shown, that is, the feature of providing circular line contact with the lens such as shown in Fig. VII throughout the edges 60 and 63 may be incorporated in a pin and tube structure, such as shown in Figs. I, IV, X, etc. and that the various specific features shown throughout the several views may be incorporated all in one combined structure.

It is also to be understood that the high position lens strap, such as shown at 5 in Figs. I and II, may have incorporated therein all of the specific features illustrated throughout the other views of the drawings.

It is also to be understood that the various spring attaching means, such as shown at 11, 24, 44, 69, etc. may be formed square or rectangular in shape and that the various resilient means attached by said attaching means may be likewise formed with openings having similar contour shape so that the side walls of the rectangular or square shaped attaching means will function as means for retaining the resilient means in proper aligned relation with each other and to the means to which they are attached.

Having described my invention, I claim:

1. A device of the character described for use with a lens having a connection opening therein, said device comprising a relatively solid portion having a face adapted to be positioned adjacent the edge of the lens and having a seat on a side surface thereof adjacent said face, resilient means secured to said face with the longitudinal axis thereof extending in the direction of the edge of the lens and having end portions adapted to engage said edge when in position thereon and a separate arm member having an end portion soldered to said seat, an intermediate resilient portion and a portion adjacent its opposite end formed with a perforation adapted to overlie a side surface of the lens with its perforation aligned with the opening in the lens and means adapted to extend within said openings for pivotally connecting said device to said lens.

2. In a device of the character described the combination of a lens having a connection opening therein and an attachment secured to said lens, said attachment comprising a relatively solid portion having a face positioned adjacent the edge of the lens and having a seat on a side surface thereof adjacent said face, resilient means secured to said face with the longitudinal axis thereof extending in the direction of the edge of the lens and having end portions engaging said edge and a separate arm member having an end portion soldered to said seat, an intermediate resilient portion and a portion adjacent its opposite end formed with a perforation overlying a side surface of the lens with its perforation aligned with the opening in the lens and means extending within said openings for pivotally connecting said device to said lens.

3. A device of the character described for use with a lens having a connection opening therein, said device comprising a relatively solid portion having a face adapted to be positioned adjacent the edge of the lens and having a seat on a side surface thereof adjacent said face, resilient means secured to said face with the longitudinal axis thereof adapted to extend in the direction of the edge of the lens and having end portions adapted to engage said edge when in position thereon and a separate arm member having an end portion mechanically secured in relatively rigid relation with said seat, an intermediate resilient portion and a portion adjacent its opposite end formed with a perforation adapted to overlie a side surface of the lens with its perforation aligned with the opening in the lens and means adapted to extend within said openings for pivotally connecting said device to said lens.

4. In a device of the character described the combination of a lens having a connection opening therein and an attachment secured to said lens, said attachment comprising a relatively solid portion having a face positioned adjacent the edge of the lens and having a seat on a side surface thereof adjacent said face, resilient means secured to said face with the longitudinal axis thereof extending in the direction of the edge of the lens and having end portions engaging said edge and a separate arm member having an end portion mechanically secured in relatively rigid relation with said seat, an intermediate resilient portion and a portion adjacent its opposite end formed with a perforation overlying a side surface of the lens with its perforation aligned with the opening in the lens and means extending within said openings for pivotally connecting said device to said lens.

5. A device of the character described for use with a lens having a connection opening therein, said device comprising a relatively solid portion having a face adapted to be positioned adjacent the edge of the lens and having a recessed seat in a side surface thereof with a shouldered wall surrounding a portion of said seat, resilient means secured to said face with the longitudinal axis thereof adapted to extend in the direction of the edge of the lens and having end portions adapted to engage said edge when in position thereon and a separate arm member having an end portion fitting with said seat with a portion of the contour of said end portion engaging the shouldered wall of said seat and rigidly anchored to said seat and having an intermediate resilient portion extending outwardly of said seat and a portion adjacent its opposite end formed with an opening adapted to overly a side surface of the lens with its opening aligned with the opening in the lens and means adapted to extend within said openings for pivotally connecting said device to said lens.

EDWARD M. SPLAINE.